United States Patent
Tsurumaru et al.

[11] Patent Number: 6,136,395
[45] Date of Patent: *Oct. 24, 2000

[54] CAN BODY HAVING IMPROVED IMPACT

[75] Inventors: Michiko Tsurumaru, Tokyo; Hiroshi Matsubayashi, Kamakura; Kazuhisa Masuda, Yokohama; Masatsune Shibue, Kawasaki, all of Japan

[73] Assignee: Toyo Seikan Kaisha Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/886,121

[22] Filed: Jun. 30, 1997

Related U.S. Application Data

[63] Continuation of application No. 08/474,463, Jun. 7, 1995, abandoned.

[51] Int. Cl.$^7$ .......................... B32B 15/08; B32B 15/20; C09D 167/02
[52] U.S. Cl. .......................... 428/35.8; 220/906; 428/220; 428/480
[58] Field of Search .................... 428/458, 910, 428/35.8, 220, 480; 72/715; 220/906

[56] References Cited

U.S. PATENT DOCUMENTS

| | | | |
|---|---|---|---|
| 4,142,790 | 3/1979 | Ueno et al. | 220/458 |
| 4,143,790 | 3/1979 | Ueno et al. | 220/458 |
| 4,362,775 | 12/1982 | Yabe et al. | 428/458 |
| 4,735,835 | 4/1988 | Taira et al. | 220/458 |
| 4,828,136 | 5/1989 | Kawahara et al. | 220/270 |
| 5,072,605 | 12/1991 | Imazu et al. | 72/46 |
| 5,112,695 | 5/1992 | Watanabe et al. | 428/480 |
| 5,137,762 | 8/1992 | Aizawa et al. | 428/35.8 |
| 5,139,889 | 8/1992 | Imazu et al. | 428/626 |
| 5,144,824 | 9/1992 | Kobayashi et al. | 428/35.8 |
| 5,228,588 | 7/1993 | Aizawa et al. | 220/458 |
| 5,249,447 | 10/1993 | Aizawa et al. | 72/46 |
| 5,300,335 | 4/1994 | Miyazawa et al. | 428/35.8 |
| 5,360,649 | 11/1994 | Sato et al. | 428/35.8 |
| 5,384,354 | 1/1995 | HAsegawa et al. | 428/458 |
| 5,700,529 | 12/1997 | Kobayashi et al. | 428/35.8 |

FOREIGN PATENT DOCUMENTS

| | | |
|---|---|---|
| 4029553 | 3/1991 | Germany . |
| 60-172637 | 9/1985 | Japan . |
| 407178485 | 12/1993 | Japan . |

OTHER PUBLICATIONS

Geil, Phillip H., Polymer Single Crystals, Robert E. Krieger Publishing Co., p. 421, 1973.

*Primary Examiner*—Ellis Robinson
*Assistant Examiner*—Sandra M. Nolan
*Attorney, Agent, or Firm*—Rader, Fishman & Grauer

[57] ABSTRACT

A metal can body of improved impact resistance of the body wall is formed by drawing and/or pressing subsequent to preliminary coating of an organic resin on at least one side of the metal surface that becomes the inner surface of the can body. The main component of the organic resin coating is a polyester resin containing oriented crystals. The intrinsic viscosity (IV) of the polyester layer is 0.60 or higher. Parameter A representing the ratio of axial orientation in the direction of the can height is $A \geq 0.40$. and Parameter B representing the degree of plane orientation of axially oriented crystals in the direction of the can height is $B \geq 0.00$.

19 Claims, 3 Drawing Sheets

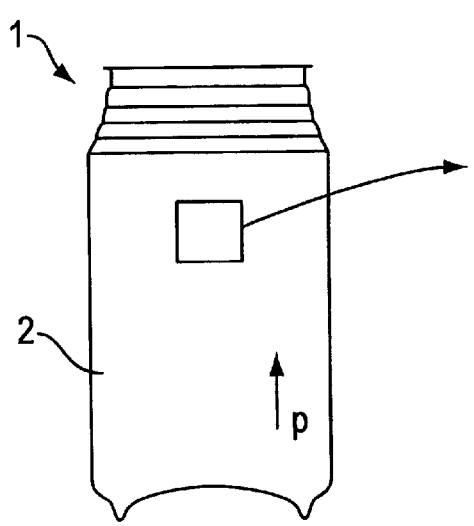
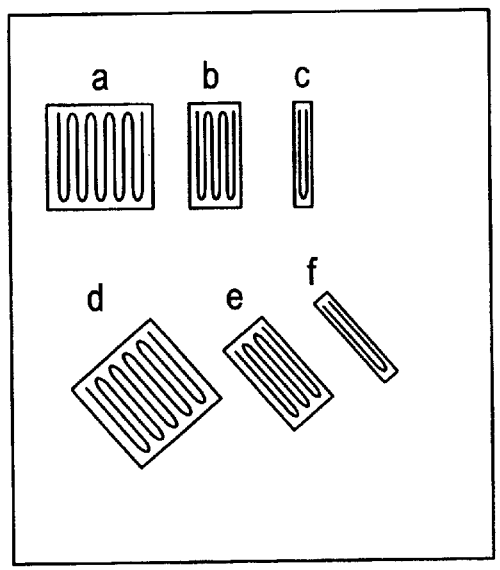
FIG. 3A  FIG. 3B
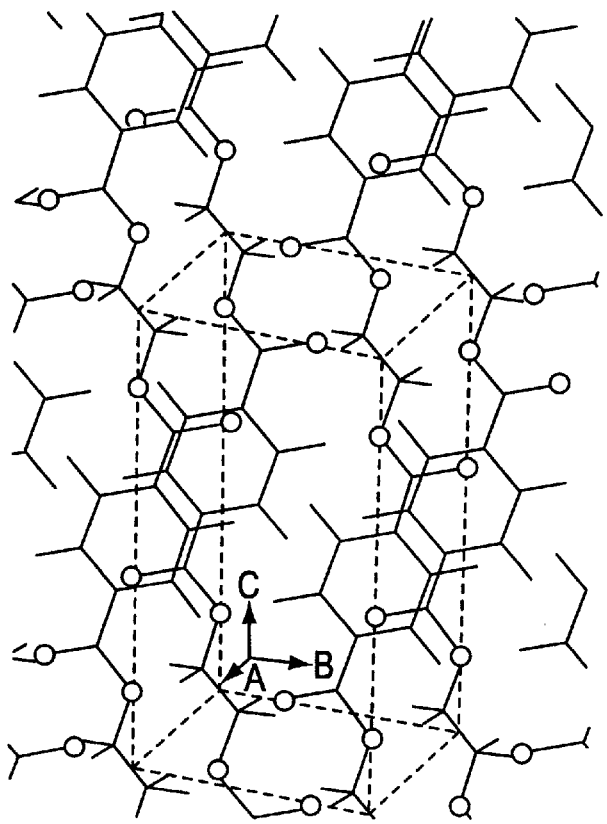
FIG. 4

CAN BODY HAVING IMPROVED IMPACT

This application is a continuation of application Ser. No. 08/474,463, filed Jun. 7, 1995, now abandoned.

BACKGROUND OF THE INVENTION

The present invention relates to a can body having improved impact resistance by preliminarily coating an organic resin onto at least one side of the metal surface that becomes the inner surface of the can body and then forming the can by pressing, extruding and/or drawing. The coating of improved impact resistance and adhesiveness is provided by a polyester resin coating that is axially and planely oriented.

Conventional cans formed by pressing, extruding or drawing having a polyester resin coating internally adhered which coating has oriented molecules and obtained by applying a thermoplastic polyester film to a metallic material by thermal adhesion followed by drawing the coated metal structure are disclosed, for example, in Japanese Laid-open Patent No.60-172637 (1985). However, the cans described therein do not have sufficient impact resistance because of the problems which include dissolution of the can metal into the contents of the can and leakage of the can contents through holes caused by corrosion of the can metal. The metal base plate becomes directly contacted with the contents of the can due to cracks developed in the polyester organic resin coating that covers the inner surface of the can when subjected to shock during transportation or dropping of a packed carton after the content are filled into the can.

Thus, the need has arisen for a can that will not develop cracks in the polyester organic resin coating on the can inner surface even when the cans are subjected to shock during transportation or dropping of a packed carton.

The disclosure of the Japanese Laid-open Patent No. 60-172637 above proposes an inner coating that is oriented; namely, a polyester coating adhered on the inner surface of the can, wherein the oriented crystals have a C-axis axial orientation. However, it has become clear that such coating has a structure similar to that of fibrous structures and that the resin coating cracks in parallel with the C-axis when subjected to impact, if the normal line of the (100) plane of the axially oriented crystal along the C-axis of the coating on the can wall is oriented in a random direction. The impact resistance of the can will not be improved without overcoming this problem.

SUMMARY OF THE INVENTION

The present inventors have studied various ways to avoid this problem and have found that improving impact resistance and corrosion resistance can be obtained by employing a polyester resin that has an intrinsic viscosity (IV, having a unit of dl/g) of 0.6 (or 0.60) or higher, controlling the parameter A which represents the existence ratio of the crystals that have C-axis orientation in the direction of the can height among the oriented crystals in the polyester coating to equal to or higher than 0.4 (or 0.40); and by controlling the parameter B which represents the existence degree of the crystals that have (100) planes in parallel with the resin coating surface among the oriented crystals that have the C-axis extending to the can height direction (existence degree of plane orientation) to equal to or higher than 0 (or 0.00).

In particular, the present invention relates to a metal can body having improved impact resistance of the body wall and which is formed by pressing and/or drawing subsequent to preliminary coating of an organic resin onto at least one side of the metal surface that becomes the inner surface of the can body. The main component of said organic resin coating can be a polyester resin containing oriented crystals. The intrinsic viscosity (IV) of the polyester resin layer can be 0.6 or higher. Further, Parameter A representing the ratio of axial orientation in the direction of the can height can be $A \geq 0.4$, and parameter B representing the degree of plane orientation of axially orientated crystals in the direction of the can height can be $B \geq 0$. The parameter A can also be the parameter showing the existence ratio of the crystals that have the C-axis extending in the can height direction among the oriented crystals in the polyester resin coating. The parameter B further can be the parameter showing the existence degree of the crystals that have (100) planes in parallel with the surface of the resin coating among the oriented crystals that have the C-axis extending in the can height direction.

BRIEF DESCRIPTION OF THE DRAWINGS

FIGS. 3A and 3B are explanatory diagrams showing a can and crystal orientation of a resin coating formed on the surface of the can.

FIG. 4 is an explanatory diagram showing a crystal orientation.

PREFERRED EMBODIMENTS OF THE INVENTION

Figure 1:
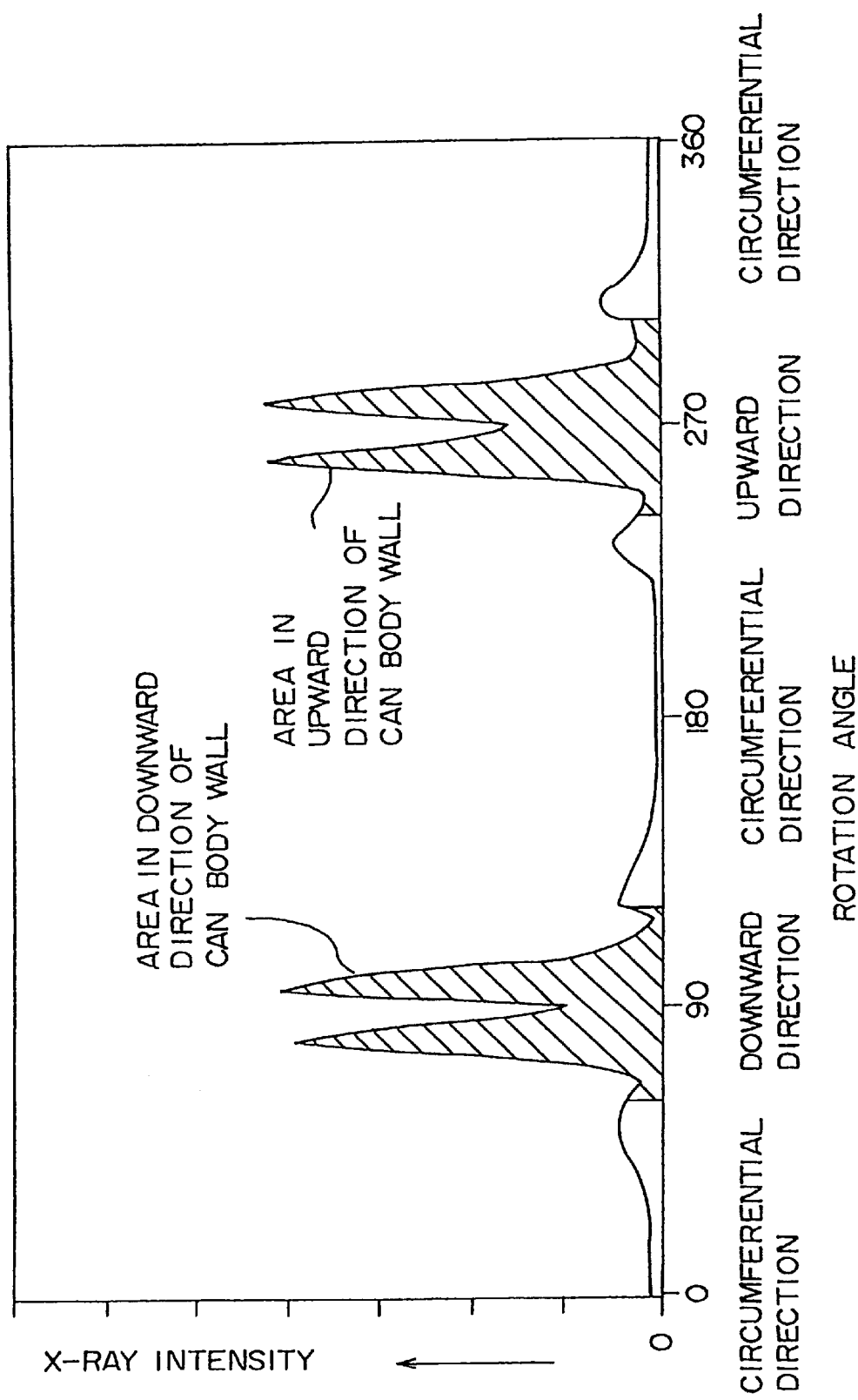
FIG. 1 shows an X-ray diffraction diagram of a coating produced in accordance with the invention.

The Parameter A is the ratio of axial orientation and parameter B is the degree of plane orientation, and both are a characteristic of the present invention, as is hereinafter explained.

Parameter A represents the existence ratio of: the crystals that have the C-axis oriented in the direction of the can height to the crystals that have the C-axis in parallel with the film surface in the polyester resin coating of the can wall (axial orientation ratio).

Parameter B represents a plane orientation ratio of the crystals, in the polyester coating of the can wall, that have axial orientation in the direction of the can height. Parameter B described herein has a different meaning from the plane orientation ratio usually determined. The plane orientation ratio usually determined includes all the crystals of which (100) planes are oriented in parallel with the film surface in addition to the crystals having C-axis oriented in the direction of the can height; parameter B is, in contrast, the existence degree of the crystals that have (100) planes in parallel with the film surface among the crystals axially oriented in the direction of the can height. By using FIGS. 3A, 3B and 4, the difference between parameter B and the plane orientation in the ordinary meanings will be further explained.

FIG. 3A shows an inner surface of a can with a resin coating is formed on an inner side 2. Arrow P shows a can 1 height direction. FIG. 3B shows an enlarged portion of the coating. FIG. 3B further shows types of crystal orientations by illustrations a through f. FIG. 4 is a schematic diagram of a crystal structure of polyethylene telephtalate (Daubaney et al, *Proceedings of the Royal Society,* 22A, 531 (1954)). The crystal axises A, B and C are shown with arrows. Crystal a shown in FIG. 3B is the one which the plane formed by B- and C-axises ((100) plane) is in parallel with the film surface plane and C-axis is in the can height direction. Crystal b shown in FIG. 3B is the one which the plane formed by B- and C-axises is inclined from the film surface plane and C-axis is in the can height direction. Crystal c is the one in which the plane formed by B- and C-axises is largely inclined from the film surface plane and the C-axis is still in the can height direction. Crystal d in FIG. 3B is the one in which the plane formed by B- and C-axises is in parallel with the film surface and C-axis is not in the can height direction. Crystal e in FIG. 3B is the one in which the plane formed by B- and C-axises is inclined from the film surface plane and C-axis is not in the can height direction. Crystal f shown in FIG. 3B is the one in which the plane formed by B- and C-axises is more inclined and C-axis is not in the can height. The ordinary plane orientation ratio can be obtained by the following equation:

Plane orientation ratio is generally shown in the following equation:

(Amount of crystals having (100) plane orientation in parallel with the film surface)/(Total amount of Crystal).

In other words, the equation of (a+d)/(a+b+c+d+e+f) represents the plane crystal orientation ratio of a crystal in general.

On the other hand, Parameter B is obtained by the following equation:

(Amount of crystal having (100) plane orientation which is in parallel to the film surface and C-axis is in parallel with the can height direction)/(Amount of crystal whose C-axis is in the can height direction).

In other words, the equation of (a)/(a+b+c) shows the parameter B.

According to the present invention, as to the polyester group resin coating, the existence degree of the crystals that have both (100) plane orientation and axial orientation in the direction of the can height is determined by measuring the existence condition of (−105) plane having the normal line that has an inclination of 8–10 degrees against the C-axis of the oriented crystal. Both of PET group crystal and PBT group crystal are triclinic having C-axis inclined to about 8 degrees and about 10 degrees respectively against the normal lines of their (−105) planes.

Parameter B is further explained in the case of PET crystals. When the C-axis of an oriented crystal is oriented in the direction of the can height and the (100) plane is in parallel with the resin coating surface (the plane is oriented) and when the [100] direction is in the upper surface of the resin coating, the diffraction peaks appear at about 98 degrees, about 8 degrees plus 90 degrees (C1), and at about 278 degrees, about 8 degrees plus 270 degrees (C2), in a X-ray diffraction analysis as shown in FIG. 2.

On the other hand, when the C-axis of the oriented crystal is oriented in the direction of the can height and the (100) plane is in parallel with the resin coating surface (the plane is oriented) and when the [100] direction is in the lower surface of the resin coating, the diffraction peaks appear at about 82 degrees (D1) and at about 262 degrees (D2) of the rotation angle.

Figure 2:
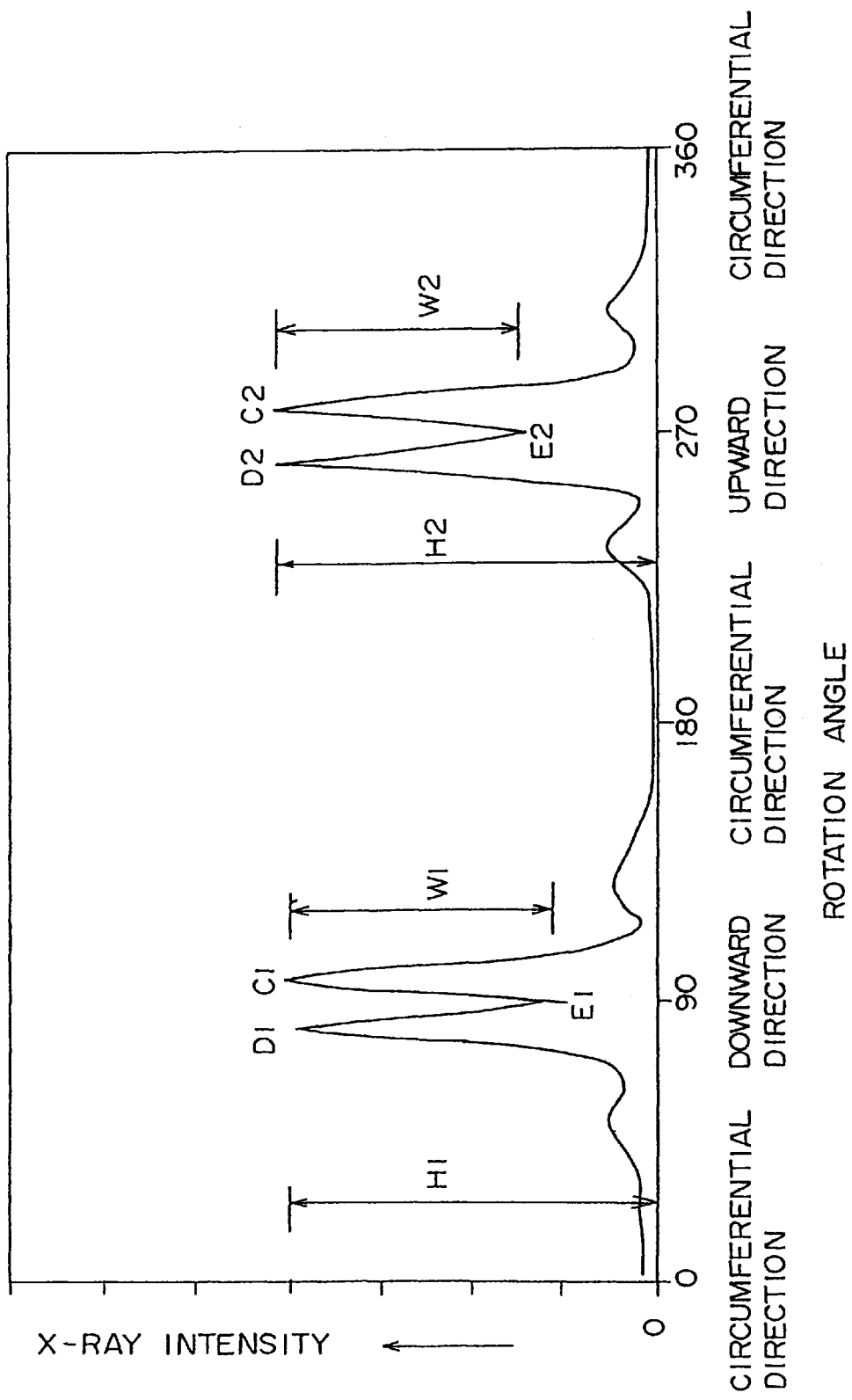
FIG. 2 shows another X-ray diffraction diagram of a coating produced in accordance with the invention.

Thus, the fact that the X-ray diffraction analysis shown in FIG. 2 indicates two diffraction peaks, at about 82 and 98 degrees, near 90 degrees and two peaks, at about 262 and 278 degrees, near 270 degrees means: the presence of oriented crystals of which the C-axis is oriented in the direction of the can height, of which [100] direction is in the upper surface of the resin coating and of which (100) plane is in parallel with the resin coating; and the presence of oriented crystals of which the C-axis is axially oriented in the direction of the can height, of which [100] direction is in the lower surface of the resin coating and of which (100) plane is in parallel with the resin coating surface.

On the other hand, even when the C-axis is oriented in the direction of the can height, if the (100) plane in the random direction and is not in parallel with the resin coating surface (the plane is not oriented), the peaks near 90 degrees are not separated and the peaks near 270 degrees are not separated, both appearing at one peak in the same X-ray diffraction analysis. Thus, the greater the number of crystals that have the plane orientation among the axially oriented crystals that have the C-axis extending to the can height direction is, the sharper the peak's separation at near 90 and 270 degrees is.

As explained, the parameter B defined herein clearly represents the existence degree of the crystals that have the plane orientation among the crystals that are axially oriented in the direction of the can height by the shape (how separated) of the diffraction peaks at near 90 degrees and 270 degrees by the X-ray analysis shown in FIG. 2.

According to the present invention, the impact resistance and corrosion resistance of a can was increased significantly by: employing a polyester resin that has an intrinsic viscosity of 0.6 or higher; controlling parameter A which represents the existence ratio of the crystals that have a C-axial orientation in the direction of the can height among the oriented crystals in the polyester coating and which is equal to or higher than 0.4; and controlling parameter B which represents the existence degree of the crystals that have (100) planes in parallel with the resin coating surface among the oriented crystals that have the C-axis extending to the can height direction and which is equal to or higher than 0. It will become apparent from the Embodying Examples and Comparative Examples that the intrinsic viscosity (IV) of the polyester to be used, parameter A, and parameter B should be in the range defined by the present invention.

The metal plate used in the present invention can be of 0.1–1.0 mm thickness, and the kinds of metal suitably useable include tin plated steel plates, TFS, nickel plated steel plates, aluminum plated steel plates, pure aluminum plates and aluminum alloy plates. These are well known in the art.

Usable crystalline polyester resins as the main component resin in the present invention include polyethylene terephthalate (PET), polybutylene terephthalate (PBT), polyethylene naphthalate, and their copolymers and blends.

The copolymer component of the polyethylene terephthalate copolymers may be an acid component or alcohol component. Examples of the acid component include: dibasic acids such as isophthalic acid, phthalic acid, and naphthalene dicarboxylic acids; fatty dicarboxylic acids such as adipic acid, azelaic acid; and alicyclic dicarboxylic acids such as cyclohexane dicarboxylic acids. Examples of the alcohol component include: aliphatic diols such as butanediol and hexanediol; and alicyclic diols such as cyclohexanediols. Single or mixture of more than one of these components may be employed. These crystalline polyesters may be used in a single layer or plurality of layers.

Embodiments

At first, methods for manufacturing metal can bodies according to the present invention are explained briefly.

EXAMPLE 1

A crystalline polyester resin of which main component has an intrinsic viscosity of 0.6 or higher is thermally coated on one side or on both sides of a metal plate and quenched quickly thereafter; thereby the metal plate coated with a polyester resin of not more than 10% crystallinity is obtained. The metal can be any of those previously mentioned. Thereafter, the polyester resin coated metal plate is drawn with conventional way to make a cup with a total drawing ratio of not less than 1.5. Then the wall of the cup is pressed to a total reduction of 15% or more. The resin coated surface forms the inner side of a cup. A thermal treatment follows then at a temperature ranging between the melt point of the polyester resin that is the main constituent of the coating and the 60° C. below the temperature of the melting point. A metal can body according to the present invention is efficiently manufactured in this way.

EXAMPLE 2

A crystalline polyester resin of which the main component has an intrinsic viscosity of 0.6 or higher is thermally coated on a metal plate on one side or on both side and quenched quickly thereafter; thereby the metal plate coated with a polyester resin of not more than 10% crystallinity is obtained. Thereafter, the polyester resin coated metal plate is drawn and/or stretched to make a cup with a total drawing ratio of not less than 1.5 and with a total reduction of 20% or more. The resin coated surface forms the inner side of the cup. A thermal treatment follows then at a temperature ranging between the melting point of the polyester resin that is the main constituent of the coating and the 60° C. below temperature of the melting point. A metal can body according to the present invention is efficiently manufactured in this way.

Now, the present invention is explained more specifically by way of the Embodying Examples. Throughout the Embodying Examples and the Comparative Examples, measurement of crystallinity and intrinsic viscosity (IV) of polyester resin, calculation of reduction, and measurement of parameters A and B were made as follows.

1. Measurement of Crystallinity and Intrinsic Viscosity (IV) of Polyester Resin

Measurement of the crystallinity of a polyester resin was made according to a method described in the literature (SEN-I GAKKAISHI, Vol. 33, No. 10 (1977), pp. 780-) wherein the scattering intensity distribution in X-ray diffraction is divided into what is attributable to crystal phase and what is attributable to amorphous phase and calculated as the ratio of integrated strength in terms of the Bragg angle.

Intrinsic viscosity (IV) of the crystalline polyester resin as used herein was measured in o-chlorophenol at 25° C. after the resin layer is isolated from the internal surface of the can body wall.

2. Calculation of reduction

Reduction is calculated by the following equation:

Reduction=((Thickness of the original plate)–

(thickness of the can body wall))×100/(Thickness of the original plate)

3. Measurement of parameters A and B

The following procedures were taken for the measurement.

The polyester resin film was isolated from the central part of the can body wall and was set to an X-ray diffractometer using a penetration method so that the isolated film became perpendicular to the incident X-ray when θ=2θ=0 degree. Then, the X-ray diffraction angle 2θ was set to 42.9 degrees, which was the diffraction angle of (–105) plane of PET polyester resin. In the case of PBT polyester resin, 2θ was 39.0 degrees. Under the X-ray diffraction condition stated below, the isolated resin film was rotated from 0 degree to 360 degrees at a speed of 0.5 degrees per second around the axis of the film's normal line to get the (–105) X-ray diffraction intensity curve in which the axis of abscissas represents the rotation angle and the axis of ordinates represents the X-ray diffraction intensity. The following rotation angles were made in correspondence with the following direction respectively: 0 degree and 180 degrees with the circumferential direction of the can; 90 degrees with the can bottom direction downward; and 270 degrees with the can height direction upward.

X-ray diffraction condition

Target: Cu, vessel voltage 40 kV, vessel current 40 mA

Divergence slit: 1 degree, and

Detection slit: 0.3 mm.

Then, the background X-ray diffraction intensity curve was obtained in the same procedures described above except the setting of X-ray diffraction angle being, 2θ=45.0 degree. The diffraction intensity curve of (–105) crystal plane was obtained, as shown in FIG. 1, by subtracting the values on the curve when 2θ=45.0 degrees (in the case of PBT resin, 2θ=39.0 degrees).

Parameter A is defined as follows (FIG. 1):

A=Y/X, wherein:

X: The total area of (–105) plane intensity with rotation angles from 0 degree to 360 degrees; and Y: The area in the rotation angle range of 90±30 degrees plus the area in the rotation angle range of 270±30 degrees.

Parameter A represents the existence ratio of: crystals that have C-axis oriented in the direction of the can height to the total PET crystals that have C-axis in parallel with the film surface. Thus parameters A represents the axial orientation ratio in the direction of the can height among the PET crystals.

In the case of PET resin, parameter B is defined as follows:

Parameter B1 is initially obtained by calculating the following H1 and W1 from the following C1, D1 and E1 around 90 degrees shown in FIG. 2.

C1: The maximum intensity within the angle range of 98±2 degrees (In the case of PBT resin, the maximum intensity within the angle range of 100±2 degrees)

D1: The maximum intensity within the angle range of 82±2 degrees (In the case of PBT resin, the maximum intensity within the angle range of 80±2 degrees)

E1: The minimum intensity within the angle range of 90±+2 degrees (Same angle range applies to PBT resin)

H1=(C1+D1)/2

W1=H1–E1

B1=W1/H1

Parameter B2 is then obtained similarly by calculating the following H2 and W2 from the following C2, D2 and E2 around 270 degrees in FIG. 2.

C2: The maximum intensity within the angle range of 278±2 degrees (In the case of PBT resin, the maximum intensity within the angle range of 280±2 degrees)

D2: The maximum intensity within the angle range of 262±2 degrees (In the case of PBT resin, the maximum intensity within the angle range of 260±2 degrees)

E2: The minimum intensity within the angle range of 270±2 degrees (Same angle range applies to PBT resin)

H2=(C2 +D2)/2

W2=H2−E2

B2=W2/H2

The average value of B1 and B2 is set to be parameter B for this can body.

Parameter B is the existence degree of the plane oriented crystals that have (100) planes in parallel with the film surface to the crystals of which C-axiz are oriented in the direction of can height. Parameter B increases as the plane oriented crystals increase.

Throughout Embodying Examples and Comparative Examples, respective tests were performed by the methods described below.

Impact test for can body wall

Into a can body made by pressing, extruding and/or drawing COCA-COLA LIGHT (Trademark of Coca-Cola Japan Co., Ltd.) was filled at 5° C., and a coated aluminum end was double seamed thereon; then it was kept in room temperature for 5 days and then in 5° C. for 2 days. Thereafter, while still stored at 5° C., impact deformation was given at the body wall near the neck and at the middle of the can body wall by dropping a rectangular block of 700 grams weigh from a height of 50 mm. After the impact, the can was kept in 5° C. for further 2 days and opened. The deformed portion of the can was measured by electric current. When the current measured was less than 0.1 mA, the test result was evaluated as "good"; when the current was not less then 0.1 mA, the test result was evaluated as "poor". This conducting test was done by placing a piece of sponge filled with 1% NaCl solution at the deformed part and by applying a voltage of 6.0 V between the negative electrode inside the sponge and the can body; the current therewith was measured.

Transportation test

Into a can body made by pressing, extruding and/or drawing COCA-COLA LIGHT was filled at 5° C., and a coated aluminum end was double seamed thereon. Twenty-four cans were packed in a corrugated case for transportation by a truck with a 1,100 km round-trip. Ten boxes (240 cans) were tested for each can type. After the transportation test, the cans were kept in 37° C. for one year, then the cans were opened and the iron pick up in the contents was analyzed by an atomic absorption method. The corrosion in the inner surface of the deformed portion due to the transportation was also observed. The amount of dissolved iron is expressed by the average value for each 240 cans.

EMBODYING EXAMPLE 1-1

On one side of a tinplate of 0.245 mm thickness, temper 4, E2.8/2.8, a crystalline polyester resin (polyethylene terephthalate/isophthalate group) of 30 μm thickness and IV of 0.85 that was in an amorphous state was coated thermally and quenched quickly. The crystallinity of this resin after coating is listed in Table 1. Using this tin plated steel plate that has resin coating on the one side and making the resin coated surface inward of a cup, the cup with an inside diameter of 65.8 mm was formed by blanking to 142 mm diameter, forming the cup with a first drawing ratio of 1.6, drawing again (second drawing ratio of 1.3), and pressing (total reduction of the three steps: 67%). This cup was trimmed to the height of 123 mm, washed and dried, and treated at a heating temperature of 210° C. (21° C. lower than the melting point of the polyester resin) for 2 minutes. Thereafter, the outer surface was printed and baking were applied. Then, the top portion of the can was necked into 57.25 mm diameter, and was flanged. The polyester resin layer coated on the can body wall was determined for IV and parameters A and B. The impact test and transportation test were performed. The test results are shown in Table 1.

EMBODYING EXAMPLES 1-2, COMPARATIVE EXAMPLES 1-1, and 1-2

In Embodying Example 1-2, the organic resin coating applied to a tin plated steel was a PBT copolymer with isophthalic acid, and IV of the resin was 0.71. Except for these differences and that the X-ray diffraction angle 2θ was 39.0 degrees, Embodying Example 1-1 was repeated including the making a can, the measurement of parameters A and B, impact test, and transportation test. The crystallinity of the resin after coating, and the test results are shown in Table 1. The heating temperature, after the washing and drying was 210° C. which is 12° C. lower temperature than the melting point of the polyester resin.

In Comparative Example 1-1, a thermosetting resin of 5 μm thickness was coated on one side (inner side) and baked. Except for these differences, The process of Embodying Example 1-1 was repeated including making a can, the measurement of parameters A and B, impact test, and transportation test. The test results are shown in Table 1.

In Comparative Example 1-2, the resin thermally coated was a polyester resin (polyethylene terephthalate/isophthalate group) that has not thermal crystallinity. Except for these differences, the process of Embodying Example 1-1 was repeated including the making a can, the measurement of IV and parameters A and B, impact test, and transportation test. The cystallinity of the resin after coating, and the test results are shown in Table 1.

EMBODYING EXAMPLE 2-1, 2-2, 2-3 AND COMPARATIVE EXAMPLES 2-1, 2-2

In Embodying Examples 2-1, 2-2, 2-3 and Comparative Examples 2-1, 2-2, IV values of the organic resin coating inside the can body were varied and were 0.74, 0.66, 0.60, 0.58, 0.55 respectively. Except for these differences, the process of Embodying Example 1-1 was repeated including the making a can, the measurement of IV and parameters A and B, impact test, and transportation test. The crystallinity of the resin after coating, and the test results are shown in Table 1. The heating temperature, after the washing and drying, was 210° C., that is 21° C., 23° C., 25° C., 26° C., 27° C. lower temperature than the melting point of polyester resin used in the respective examples.

EMBODYING EXAMPLE 3-1

On one side of a tinplate of 0.245 mm thickness, temper 4, E2.8/2.8, a crystalline polyester resin (polyethylene terephthalate/isophthalate group) of 30 μm thickness and IV of 0.85 that was in biaxially oriented state was coated thermally; the retention period of time at a temperature of 230° C. was adjusted so that the crystallinity of the polyester resin of the laminated tin plate before forming a can body was 5%; and quenched quickly. Except that this tin plated steel plate coated on one side with the polyester resin was used, the process employed by Embodying Example 1-1 was repeated to obtain a can, and the polyester resin layer coated on the can body wall was determined for IV and the parameters A and B. Impact test and transportation test were likewise made. The results are shown in Table 1.

COMPARATIVE EXAMPLE 3-1, 3-2

In Comparative Examples 3-1 and 3-2, the crystallinity of the polyester resin laminated on tinplate before forming were 15% and 24% respectively. Except for these differences, the process of the Embodying Example 3-1 was repeated including making a can, the measurement of IV and parameters A and B, impact test, and transportation test. The crystallinity of the resin after coating, and the test results are shown in Table 1.

EMBODYING EXAMPLE 4-1

On one side surface of a tinplate of 0.245 mm thickness, temper 4, E2.8/2.8, a crystalline polyester resin (polyethylene terephthalate/isophthalate group) of 30 μm thickness and IV value of 0.85 that was in amorphous state was coated thermally; the retention period of time at a temperature of 210° C. was adjusted so that the crystallinity of the polyester resin of the laminated tinplate before forming was 10%; and quenched quickly. Except that this tin plated steel plate coated on one side with the polyester resin was used, the process of Embodying Example 1-1 was repeated to obtain a can. The polyester resin layer coated on the can body wall was likewise determined for IV value and the parameters A and B. Impact test and transportation test were made. The results are shown in Table 1.

COMPARATIVE EXAMPLE 4-1

In Comparative Example 4-1, the crystallinity of the polyester resin of laminated inplate before forming was 18%. Except for this differences, the process of Embodying Example 4-1 was repeated including making a can, the measurement of IV value and parameters A and B, impact test, and transportation test. The crystallinity of the resin after coating, and the test results are shown in Table 1.

EMBODYING EXAMPLE 5-1

On one side of a tinplate of 0.245 mm thickness, temper 4, E2.8/2.8, a crystalline polyester resin (polyethylene terephthalate/isophthalate group) of 17 μm thickness and IV value of 0.85 that was in an amorphous state was coated thermally and quenched quickly. The crystallinity of this resin after coating is listed in Table 1. Using this tin plated steel plate that has resin coating on one side and making the resin coated surface inward of a cup, a cup with inside diameter of 65.8 mm was formed by a process that comprises blanking to 142 mm diameter, forming a cup at with a first drawing ratio of 1.6, drawing again (second drawing ratio of 1.3), and pressing or extruding (total reduction of the 3 steps: 40%). This cup was trimmed to the height of 60 mm, washed and dried, and treated at a heating temperature of 210° C. (21° C. lower than the melt point of the polyester resin) for 2 minutes.

Thereafter, outer surface was printed and baking were applied. Then, the top portion of the can was necked in to 63.5 mm, and was flanged. The polyester resin layer coated on the can body wall was determined for IV value and parameters A and B. The impact test and transportation test were performed. The test results are shown in Table 1.

EMBODYING EXAMPLE 5-2 AND COMPARATIVE EXAMPLES 5-1, 5-2

In Embodying Example 5-2, thickness of the thermally coated resin was 13 μm, the number of steps of ironing was two, total reduction was 20%, and the trimmed height was 50 mm. Except for these differences, the process of Embodying Example 5-1 was repeated including making a can, the measurement of IV value and parameters A and B. impact test, and transportation test. The crystallinity of the resin after coating, and the test results are shown in Table 1.

In Comparative Example 5-1, thickness of the thermally coated resin was 11 μm, the number of steps of pressing or extruding was one, total reduction was 10%, and the trimmed height was 40 mm. Except for these differences, the process of Embodying Example 5-1 was repeated including making a can, the measurement of IV and parameters A and B, impact test, and transportation test. The crystallinity of the resin after coating, and the test results are shown in Table 1.

In Comparative Example 5-2, thickness of the thermally coated resin was 10 μm, the cup was made by drawing without pressing and extruding, and the trimmed height was 40 mm. Except for these differences, the process of Embodying Example 5-1 was repeated including making a can, the measurement of IV value and parameters A and B, impact test, and transportation test. The crystallinity of the resin after coating, and the test results are shown in Table 1.

EMBODYING EXAMPLES 6-1, AND 6-2 AND COMPARATIVE EXAMPLES 6-1 THROUGH 6-3

In Embodying Examples 6-1 and 6-2 and Comparative Examples 6-1 through 6-3, the thermal treatments after the washing and drying were made at 210° C. (21° C. lower temperature than the melting point of the polyester resin) for 0.5 minutes, 180° C. (51° C. lower temperature than the melt point of the polyester resin) for 2 minutes, 1000C (131° C. lower temperature than the melting point of the polyester resin) for 2 minutes, without heating, and 250° C. (19° C. higher temperature than the melting point of the polyester resin) for 2 minutes, respectively. Except for these differences, the process of Embodying Example 1-1 was repeated including making a can, the measurement of IV and parameters A and B, impact test, and transportation test. The crystallinity of the resin after coating, and the test results are shown in Table 1.

EMBODYING EXAMPLE 7-1

On one side of TFS of 0.245 mm thickness, temper 4, a crystalline polyester resin (polyethylene terephthalate/isophthalate group) of 14 μm thickness and IV of 0.85 that was in an amorpphous state, and on the other side a crystalline polyester resin (polyethylene terephthalate/isophthalate group) of 14 μm thickness that was in an amorphous state and printed was coated thermally and quenched quickly. The crystallinity of the resin (inner side) after coating is listed in Table 1. Using this TFS that has a resin coating on both side and making the printed surface the outline of the cup, a cup with an inside diameter of 65.8 mm was formed by a process that comprises blanking to 142 mm diameter, forming a cup with a first drawing ratio of 1.6 and second drawing ratio of 1.3 with stretch drawing (total reduction: 30%). This cup was trimmed to the height of 50 mm. This cup was then treated at a heating temperature of 210° C. (21° C. lower than the melting point of the polyester resin) for 2 minutes. Thereafter, the top portion of the can was necked in to 63.5 mm, and was flanged. The polyester resin layer coated on the can body wall was determined for IV and parameters A and B. The impact test and transportation test were performed. The test results are shown in Table 1.

EMBODYING EXAMPLE 7-2

In Embodying Example 7-2, the thickness of the thermally coated resin was 13 μm, total reduction with stretch drawing was 20%, and the trimmed height was 50 mm. Except for these differences, the process of Embodying Example 7-1 was repeated including making a can, the measurement of IV and parameters A and B, impact test, and transportation test. The crystallinity of the resin of the inner surface after coating and the test results are shown in Table 1.

TABLE 1

| | Resin used | c | d | e A | B | f g | h | Condition Method | m | Thermal Treatment after forming Temperature (° C.) | Treatment time (min.) | n | Transportation test p | u |
|---|---|---|---|---|---|---|---|---|---|---|---|---|---|---|
| Embodying Example 1-1 | a | Yes | 0.85 | 0.82 | 0.69 | 0 | 0 | j | 67 | 210 | 2 | Good | q | 0.00 |
| Embodying Example 1-2 | v | Yes | 0.71 | 0.79 | 0.78 | 0 | 0 | j | 67 | 210 | 2 | Good | q | 0.00 |
| Comparative Example 1-1 | b | — | — | * | * | — | — | j | 67 | 210 | 2 | Good | r | — |
| Comparative Example 1-2 | a | No | 0.73 | * | * | 0 | 0 | j | 67 | 210 | 2 | Poor | r | — |
| Embodying Example 2-1 | a | Yes | 0.74 | 0.84 | 0.54 | 0 | 0 | j | 67 | 210 | 2 | Good | q | 0.00 |
| Embodying Example 2-2 | a | Yes | 0.66 | 0.77 | 0.53 | 0 | 0 | j | 67 | 210 | 2 | Good | q | 0.00 |
| Embodying Example 2-3 | a | Yes | 0.60 | 0.75 | 0.51 | 0 | 0 | j | 67 | 210 | 2 | Good | q | 0.00 |
| Comparative Example 2-1 | a | Yes | 0.58 | 0.75 | 0.48 | 0 | 0 | j | 67 | 210 | 2 | Poor | s | 1.25 |
| Comparative Example 2-2 | a | Yes | 0.55 | 0.72 | 0.42 | 0 | 0 | j | 67 | 210 | 2 | Poor | t | 13.0 |
| Embodying Example 3-1 | a | Yes | 0.85 | 0.63 | 0.15 | 5 | — | j | 67 | 210 | 2 | Good | q | 0.00 |
| Comparative Example 3-1 | a | Yes | 0.85 | 0.35 | −0.04 | 15 | — | j | 67 | 210 | 2 | Poor | s | 2.43 |
| Comparative Example 3-2 | a | Yes | 0.85 | 0.21 | −0.08 | 24 | — | j | 67 | 210 | 2 | Poor | r | — |
| Embodying Example 4-1 | a | Yes | 0.85 | 0.79 | 0.52 | — | 10 | j | 67 | 210 | 2 | Good | q | 0.00 |
| Comparative Example 4-1 | a | Yes | 0.85 | 0.37 | −0.06 | — | 18 | j | 67 | 210 | 2 | Poor | s | 2.76 |
| Embodying Example 5-1 | a | Yes | 0.85 | 0.76 | 0.31 | 0 | 0 | j | 40 | 210 | 2 | Good | q | 0.00 |
| Embodying Example 5-2 | a | Yes | 0.85 | 0.48 | 0.21 | 0 | 0 | j | 20 | 210 | 2 | Good | q | 0.00 |
| Comparative Example 5-1 | a | Yes | 0.85 | 0.37 | −0.05 | 0 | 0 | j | 10 | 210 | 2 | Poor | s | 2.28 |
| Comparative Example 5-2 | a | Yes | 0.85 | 0.25 | * | 0 | 0 | drawing | 0 | 210 | 2 | Poor | s | 4.21 |
| Embodying Example 6-1 | a | Yes | 0.85 | 0.73 | 0.57 | 0 | 0 | j | 67 | 210 | 0.5 | Good | q | 0.00 |
| Embodying Example 6-2 | a | Yes | 0.85 | 0.65 | 0.26 | 0 | 0 | j | 67 | 180 | 2 | Good | q | 0.00 |
| Comparative Example 6-1 | a | Yes | 0.85 | 0.53 | −0.20 | 0 | 0 | j | 67 | 100 | 2 | Poor | s | 1.38 |
| Comparative Example 6-2 | a | Yes | 0.85 | 0.57 | −0.14 | 0 | 0 | j | 67 | — | — | Poor | t | 8.73 |

TABLE 1-continued

| | Resin used | c | d | e A | B | f g | h | Condition Method | m | Thermal Treatment after forming Temperature (° C.) | Treatment time (min.) | Transportation n | test p | u |
|---|---|---|---|---|---|---|---|---|---|---|---|---|---|---|
| Comparative Example 6-3 | a | Yes | 0.85 | 0.33 | * | 0 | 0 | j | 67 | 250 | 2 | Poor | t | 12.2 |
| Embodying Example 7-1 | a | Yes | 0.85 | 0.66 | 0.36 | 0 | 0 | k | 30 | 210 | 2 | Good | q | 0.00 |
| Embodying Example 7-2 | a | Yes | 0.85 | 0.63 | 0.00 | 0 | 0 | k | 20 | 210 | 2 | Good | q | 0.00 |

(Note) In Table 1, impact resistance was evaluated as G Good when the current was less than 0.1 mA or less and as P Poor when the current was 0.1 mA or more according to the evaluation as stated above. The cans with the current of 0.1 mA or more can have some practical problems.

The notations a–u have the following meanings:
a: PET copolymerized with isophthalic acid group
b: Thermosetting resin
c: Resin crystallinity
d: Instrinsic viscosity (IV) of resin on the can body wall
e: Evaluation parameter (*: Without peak)
f: Crystallinity (%) after lamination (before forming)
g: Oriented crystals
h: Thermally grown nonoriented crystals
j: Draw and ironing
k: Stretch drawing
m: Reduction (%)
n: Impact resistance of can body wall
o: Significant defect when formed
p: Corrosion of inner wall of a can
q: Normal
r: Perforation of can body wall
s: Spot corrosion
t: Pitting
u: Dissolved iron (ppm)
v: PBT copolymerized with isophthalic acid group
Evaluation Embodying Examples 1-1, 1-2, 2-1 through 2-3, 3-1, 4-1, 5-1, 5-2, 6-1, 6-2, 7-1 and 7-2 show that the impact resistance of the can body wall is excellent when: the polyester resin of inner wall of can body is a crystalline polyester; parameter A is 0.4 or more; parameter B is 0 or more; and IV is 0.6 or more.

Comparative Examples 1-1 and 1-2 show that when a polyester resin has no thermal crystallinity and the inner wall polyester resin is not crystallized (parameters A and B are unable to be measured), and the impact resistance is poor in such case even when IV is 0.6 or more. When the resin coating is a thermosetting resin, defects in the resin develop during the draw and pressing, and the formed can is unsatisfactory.

Comparative Examples 3-1, 3-2, 4-1, 5-1, 5-2 and 6-3 show that the impact resistance is poor when parameter A is less than 0.4 and when parameter B is less than 0 even though the laminated resin is a crystalline polyester and the IV is 0.6 or more.

Comparative Examples 2-1 and 2-2 show that the impact resistance is poor when the IV is less than 0.6 even though the laminated resin is the crystalline polyester with parameter A of 0.4 or more and with parameter B of 0 or more.

Comparative Examples 6-1 and 6-2 show that the impact resistance is poor when parameter B is less than 0 even though the laminated resin is the crystalline polyester with parameter of 0.4 or more and with IV of 0.6 or more.

According to the present invention, impact resistance of a metal can body is significantly improved by providing a polyester resin coating on the inner side of the can body wall, the polyester resin having a main component with a specified intrinsic viscosity (IV), axial orientation ratio and plane orientation degree.

What is claimed is:

1. A metal can body having improved impact resistance having a can height direction and an inner surface coated with a coating of an organic resin, wherein:

a main component of said organic resin coating is a polyester resin containing axially oriented crystals;

an intrinsic viscosity (IV) of said polyester is 0.6 dl/g or more;

parameter A representing the ratio of axial orientation of the crystals in the can height direction is $A \geq 0.4$; and parameter B representing the degree of plane orientation of axially orientated crystals in the can height direction is $B \geq 0$;

wherein the parameter A is a parameter showing the existence ratio of the crystals that have the C-axis extending to the can height direction among the oriented crystals in the polyester resin coating, and wherein the parameter B is a parameter showing the existence degree of the crystals that have (100) planes in parallel with the surface of the resin coating among the oriented crystals that have the C-axis extending to the can height direction, wherein the polyester resin comprises polyethylene terephthalate, polybutylene terephthalate, polyethylene terephthalate copolymer, or polybutylene terephthalate copolymer, and wherein the polyester resin has a degree of crystallization prior to being formed into a can body of 10% or smaller.

2. A metal can body according to claim 1, which is formed by applying the coating of an organic resin onto at least one surface of a metal plate surface that becomes the inner surface of the can body, and then pressing, extruding, or drawing the metal plate to form the metal can body.

3. A metal can body according to claim 1, wherein the metal is selected from the group consisting of tin plated steel, tin-free steel, nickel plated steel, aluminum plated steel, aluminum, and aluminum alloys.

4. A metal can body according to claim 1, wherein the polyester comprises a polyethylene terephthalate/isophthalate copolymer.

5. A metal can body according to claim 1, wherein the polyester comprises a polybutylene terephthalate/isophthalate copolymer.

6. A metal can body according to claim 1, wherein the polyester has an intrinsic viscosity of from 0.6 to 0.85 dl/p.

7. A metal can body according to claim 1, wherein parameter A is from 0.4 to 0.84.

8. A metal can body according to claim 1, wherein parameter B is from 0 to 0.78.

9. A metal can body according to claim 1, wherein parameter B is from 0.15 to 0.78.

10. A metal can body according to claim 2, wherein the coating is thermal treated between the melting point of the polyester and 60° C. below the melting point of the polyester after application to the metal plate.

11. A metal can body according to claim 2, wherein the metal plate coated with the coating is pressed to a total reduction of 15% or more.

12. A metal can body according to claim 1, wherein the polyester comprises polyethylene terephthalate or a copolymer of polyethylene terephthalate.

13. A metal can body according to claim 1, wherein the polyester comprises polyethylene terephthalate or a copolymer of polyethylene terephthalate and isophthalic acid.

14. A metal can body according to claim 1, wherein the can body is formed by (i) drawing and ironing or (ii) stretching and drawing method.

15. A metal can body according to claim 1, wherein the can body is formed by drawing and ironing.

16. A metal can body according to claim 15, wherein the total reduction in the wall thickness of the can body is 15% or larger.

17. A metal can body according to claim 1, wherein the metal can body is formed by stretching and drawing and wherein the, total reduction in the wall thickness of the can body is 20% or larger.

18. A metal can body according to claim 1, produced by use of a reduction drawing ratio of 1.5 or greater.

19. A metal can body having improved impact resistance having a can height direction and an inner surface coated with a coating of an organic resin, wherein:

a main component of said organic resin coating is a polyester resin containing axially oriented crystals;

an intrinsic viscosity (IV) of said polyester is 0.6 dl/g or more;

parameter A representing the ratio of axial orientation of the crystals in the can height direction is A≧0.4; and parameter B representing the degree of plane orientation of axially orientated crystals in the can height direction is B≧0;

wherein the parameter A is a parameter showing the existence ratio of the crystals that have the C-axis extending to the can height direction among the oriented crystals in the polyester resin coating, and wherein the parameter B is a parameter showing the existence degree of the crystals that have (100) planes in parallel with the surface of the resin coating among the oriented crystals that have the C-axis extending to the can height direction, wherein the polyester resin comprises polyethylene terephthalate, polybutylene terephthalate, polyethylene terephthalate copolymer, or polybutylene terephthalate copolymer, and wherein the polyester resin has a degree of crystallization prior to being formed into a can body of 10% or smaller, wherein the metal can body is formed by applying the coating onto at least one surface of a metal plate surface that becomes the inner surface of the can body, and then pressing, extruding, or drawing the metal plate to form the metal can body, wherein the polyester before being applied to the metal plate is amorphous.

* * * * *